No. 834,655. PATENTED OCT. 30, 1906.
C. F. BECKWITH.
EYEGLASSES.
APPLICATION FILED JAN. 8, 1906.

WITNESSES
O. T. Palmer
C. H. Gannett

INVENTOR
Charles F. Beckwith
by N. N. Spencer
Attorney

UNITED STATES PATENT OFFICE.

CHARLES FRANCIS BECKWITH, OF BOSTON, MASSACHUSETTS, ASSIGNOR OF ONE-HALF TO THOMAS W. SPENCER, OF WATERTOWN, MASSACHUSETTS.

EYEGLASSES.

No. 834,655.     Specification of Letters Patent.     Patented Oct. 30, 1906.

Application filed January 8, 1906. Serial No. 295,033.

*To all whom it may concern:*

Be it known that I, CHARLES FRANCIS BECKWITH, of Boston, in the county of Suffolk and State of Massachusetts, have invented certain new and useful Improvements in Eyeglasses, of which the following is a specification.

This invention relates especially to the box of the lens-stud and the bow-spring and nose-guard which are attached thereto.

The object sought and attained by my invention is permanence of attachment of the parts named, whereby the annoyance of loosened glasses, so often experienced under the old construction, is avoided.

The common eyeglass frame or mounting has the stud-box opening elongated transversely to the lenses and the spring and guard-arms fastened to the box by screws through their terminals entering the studs axially, each screw extending toward a lens. Spreading strain on the spring thus tends to loosen the screw connection.

In my improvement the strains of use, tending to separate the two lenses, apply transversely to the screws and not in the direction of their length, and hence the tendency of the parts to become loosened is overcome and much greater durability is attained.

My improvements are well illustrated in the appended drawings, in which—

Figure 1:
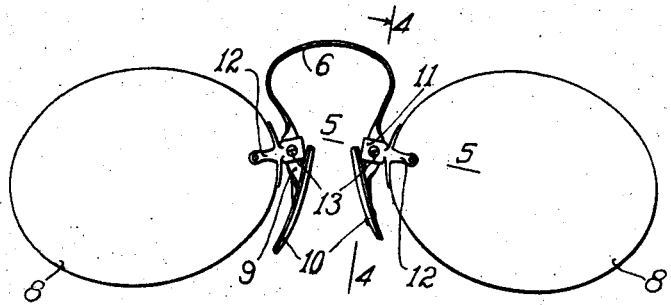
Figure 3:
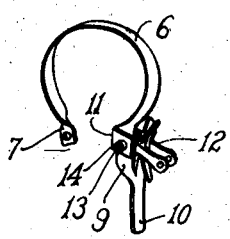
Figure 2:
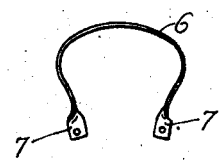
Figure 4:
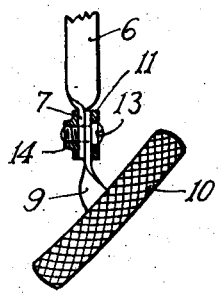
Figure 5:
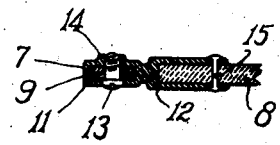

Figure 1 represents the eyeglass complete. Fig. 2 is a front view of the spring detached. Fig. 3 shows in perspective the spring with one stud and nose-guard in position. Figs. 4 and 5 are enlarged sections through the box-stud, taken, respectively, on lines 4 4 and 5 5 of Fig. 1.

The spring 6 has its terminal portions 7 abruptly twisted a quarter-turn, so as to stand in the general plane of the lenses 8. The arms 9 of the nose-guards 10 are similarly twisted terminally, so as also to occupy said plane, the terminals of said spring and arms entering vertically from above and below into the box portion 11 of the studs 12, where they are secured in close contact by the horizontal screws 13 passing through perforations in said terminals. These spring and arm ends exactly fit edgewise and flatwise in the vertically-open box 11. The shoulders formed by the abrupt twist given to these parts also bear firmly against the upper and lower edges of the box at opposite corners.

The box itself is of novel construction, in that its vertical opening to receive the guard-arm and spring end is elongated in the direction of the lenses and that one of its vertical sides is perforated to admit the body and head of the screw 13, while the opposite side is thickened or formed with a central boss 14, perforated and threaded to receive a plurality of threads of the screw 13. Thus formed the screws extend from front to rear or from rear to front, as shown, their threads having a substantial engagement in the boss 14 and the flat under side of the screw-head drawing the spring and guard-arm toward the boss. (See Figs. 4 and 5.) This gives the firmest possible construction, and as the screws extend parallel to the lens-rivets 15 and transverse to the plane of the lenses the strains of use have no tendency to loosen the screws, the tips of which may be headed or upset, so as to remain immovable.

I claim as my invention—

1. The improvement in eyeglasses, consisting in a bowed spring having its terminal portions flattened, perforated and twisted to extend edgewise in the general plane of the lenses, and adapted to be secured to the box portion of the lens-stud by horizontally-arranged fastenings transverse to said plane, substantially as set forth.

2. The improvement in eyeglasses, consisting in a bowed spring and nose-guard arms having their free ends flattened, perforated and twisted to extend edgewise in the general plane of the lenses, in combination with lens-studs each having an open box portion elongated in said plane, to receive such free ends vertically and overlapping, and with transverse, horizontally-arranged fastenings for said parts, substantially as set forth.

3. The improvement in eyeglasses, consisting in a bowed spring and nose-guard arms each having flattened, perforated and abruptly-twisted end portions, in combination with lens-studs each formed with an open box portion elongated in the plane of the lenses and adapted to receive snugly and flatwise the lapped, perforated end portions of the bowed spring and the nose-guard arm, screw-held therein, such box being formed on one side with a threaded central boss and on its opposite side with a perforation in line therewith, such thread and perforation being respectively adapted to admit the threaded body and head of the screw, extending horizontally and transversely to the plane of the lenses, and serving to tightly secure said spring and arms to each other and said box.

4. The improvement in eyeglasses, consisting in a lens-frame or mounting comprising lens-studs each formed with a box portion having a vertical opening through it elongated in the plane of the lenses, such box portion being horizontally perforated in a direction transverse to said plane and having one side thickened and threaded in said perforation, in combination with a bowed spring and nose-guard arms perforated, abruptly twisted terminally to enter said elongated box, receive said screw and bear with their twisted shoulders on the box edges, for the purpose set forth.

In testimony whereof I have affixed my signature in presence of two witnesses.

CHARLES FRANCIS BECKWITH.

Witnesses:
  A. H. SPENCER,
  THOS. W. SPENCER.